United States Patent [19]
Nilssen

[11] Patent Number: 5,083,784
[45] Date of Patent: * Jan. 28, 1992

[54] INVESTMENT LOTTERY PROCESS AND SYSTEM

[76] Inventor: Ole K. Nilssen, Caesar Dr., Barrington, Ill. 60010

[*] Notice: The portion of the term of this patent subsequent to Mar. 5, 2008 has been disclaimed.

[21] Appl. No.: 668,899

[22] Filed: Mar. 13, 1991

Related U.S. Application Data

[63] Continuation-in-part of Ser. No. 119,045, Nov. 10, 1987.

[51] Int. Cl.[5] .................. A63B 71/00; G06F 15/20
[52] U.S. Cl. ......................... 273/138 R; 273/138 A; 364/408
[58] Field of Search ............... 273/138 R, 138 A; 434/107; 364/408, 412

[56] References Cited
U.S. PATENT DOCUMENTS 4,997,188  3/1991  Nilssen ..................... 273/138 R

OTHER PUBLICATIONS

"Scarne's New Complete Guide to Gambling", by John Scarne, pub. Simon & Schuster, © 1961, 1974, p. 146.
"Financial Tools Used in Money Management", by Joyce Pitts, pub. U.S. Dept. of Agriculture, Oct. 1986, pp. 2 and 2.3–2.5.

Primary Examiner—William H. Grieb
Assistant Examiner—Raleigh W. Chiu

[57] ABSTRACT

A central entity issues lottery tickets to various individual entities, such as persons, in exchange for sums of money. The central entity cumulates the money thereby received and uses it for generating earnings, such as interest or dividends from investments. The holder of each lottery ticket is entitled periodically to participate in lottery drawings by which a substantial portion of the earnings for a preceeding period is paid to but one or a few of the lottery ticket holders. As a result, each lottery ticket is in effect everlasting, participating in lottery drawings on a periodic basis, such as once each week, for an indefinitely long duration. At an earnings rate of 10% per annum and with a total of $10 billion having been accumulated in lottery receipts, the weekly earnings would be about $20 million; which, if disbursed over a period of 20 years or so, as is typically done by state lottery systems, could be touted as amounting to a $50 million lottery prize.

8 Claims, 1 Drawing Sheet

INVESTMENT LOTTERY PROCESS AND SYSTEM

RELATED APPLICATIONS

This is a Continuation-in-Part of Ser. No. 07/119,045 filed Nov. 10, 1987.

BACKGROUND OF THE INVENTION

1. Field of the Invention

The present invention relates to lottery systems capable of providing for an improved probability-of-winning versus cost-of-participation.

2. Description of Prior Art

Ordinary lottery systems operate in such manner as to sell lottery tickets for a certain total amount of money, and then to distribute a relatively small part of that total as prices to a relatively few winning tickets. On the average, the return per dollar invested in lottery tickets is very poor—typically less than 50 cents per dollar.

Never-the-less, apparently due to psychological satisfaction associated with the possibility of winning a large prize, people buy lottery tickets in spite of the exceedingly poor average monetary returns.

SUMMARY OF THE INVENTION

Objects of the Invention

A general object of the present invention is the provision of a lottery process and system operative to increasing the average monetary return from an investment in a lottery ticket yet without depreciating the psychological satisfaction associated with the possibility of winning.

A more specific object is the provision of a lottery system wherein the proceeds from the sale of lottery tickets is placed in profit-generating investments, the profits from which are used as lottery prizes on an ongoing periodic basis.

Another more specific object is the provision of a lottery system that provides for an increased incentive to invest in lottery tickets, thereby enhancing the national savings rate.

A yet even more specific object is that of providing a lottery system wherein a lottery ticket, once purchased, continues on ongoing periodic basis to provide chances for winning a large prize.

These as well as other objects, features and advantages of the present invention will become apparent from the following description and claims.

BRIEF DESCRIPTION

A lottery-ticket-issuing entity issues a large number of uniquely coded lottery tickets to various individual entities, such as persons, in exchange for value received; which value is indicated on the lottery ticket. The proceeds received from the issued lottery tickets are placed in various profit-producing investments; from which investments result a substantially continuous flow of profits. The holder of each lottery ticket in entitled to receive a certain average rate of monetary return commensurate with the value represented by that ticket as well as proportional to the profits earned.

To avoid the extremely high transaction costs associated with periodic payments of a relatively modest amount of income to the holders of each of the numerous uniquely coded lottery tickets, a lottery method is used. By way of this lottery method, a relatively few lottery tickets are randomly chosen at the end of each of a continuous sequence of time periods, and all the income attributable to all the issued lottery tickets for the associated time period is then paid to the holders of the relatively few lottery tickets chosen for that time period.

Thus, each holder of a lottery ticket will, on a probabilistic basis, receive an income from that ticket.

Subject lottery process and system comprises the following key steps and component parts:

(1) ticket-issuing and money-receiving entity operative, in return for money received, to issue to each of various individual entities a number of uniquely coded lottery tickets, thereby in total having issued a large number of lottery tickets and received therefor a large amount of money;

(2) utilization means functionally related to the ticket-issuing and money-receiving entity and operative to place the large amount of money received by it in profit-generating investments, thereby to generate a substantially continuous flow of profits, which flow of profits cumulate into a disbursement fund;

(3) random-choice and disbursement entity functionally related to the ticket-issuing and money-receiving entity, the utilization entity, and the various individual entities, the random-choice and disbursement entity being operative for each of plural time periods to randomly choose one of the large number of uniquely coded lottery tickets and to make a relatively large disbursement from the disbursement fund to the individual entity holding the chosen ticket.

DESCRIPTION OF THE PREFERRED EMBODIMENT

Details of Construction

Figure 1:
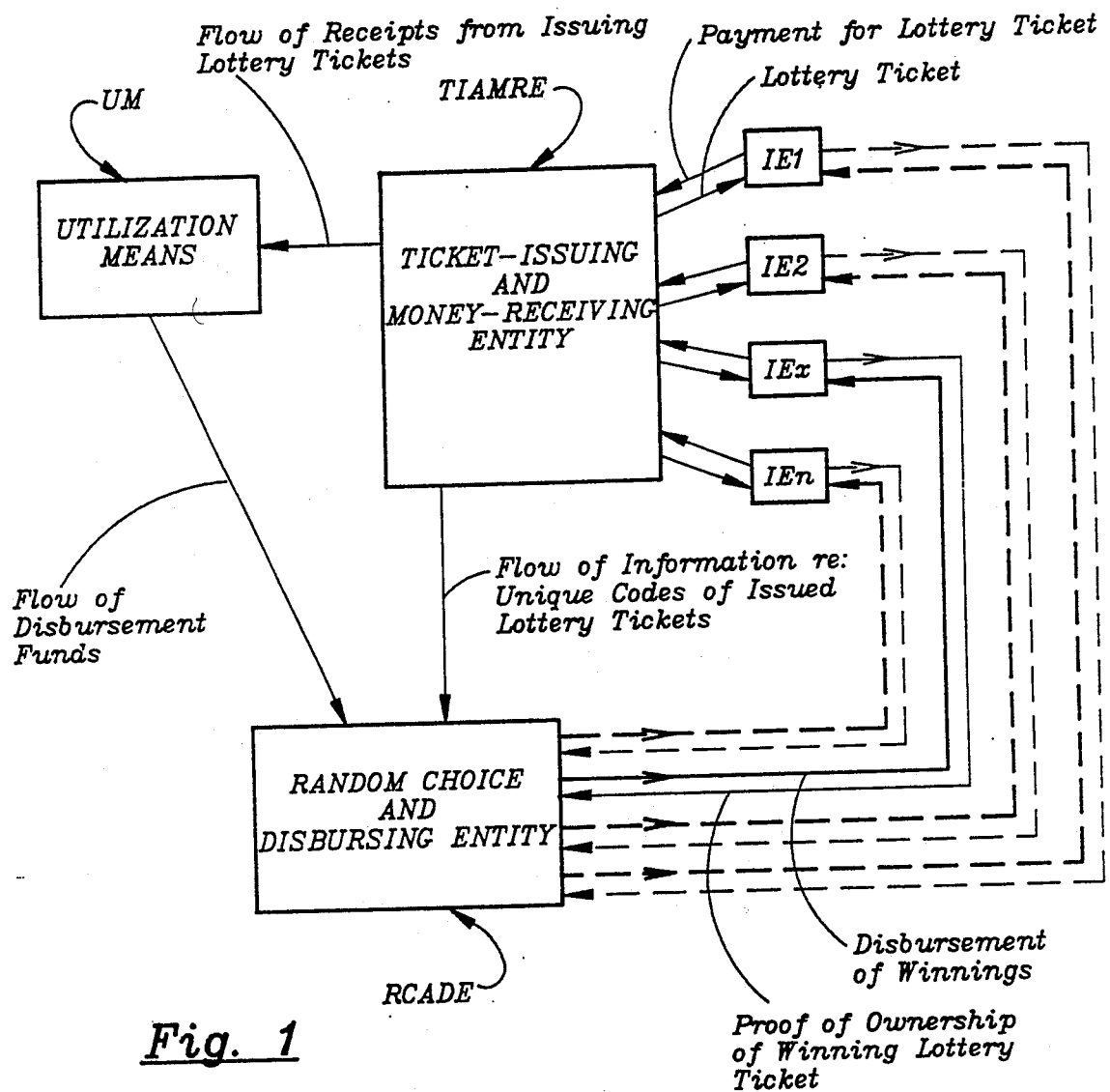
FIG. 1 diagrammatically illustrates the preferred embodiment of the invention.

FIG. 1 is a combination systems-process diagram that illustrates the system operative to effectuate the process associated with the present invention.

In FIG. 1, numerous individual entities, which may be human beings, are identified as IE1, IE2 ... IEx ... IEn; each of which numerous individual entities is operationally connected with a ticket-issuing and money-receiving entity TIAMRE as well as with a random choice and disbursing entity RCADE. The ticket-issuing and money-receiving entity TIAMRE is operationally connected with a utilization means UM as well as with the random choice and disbursing entity RCADE. The utilization means UM is operationally connected with the random choice and disbursing entity RCADE.

Details of Operation

Numerous individual entities (IE1/IE2/IEx/IEn) will, at one time or another, interact with the ticket-issuing and money-receiving entity TIAMRE in such manner as to convey to it one or more amounts of money in exchange for one or more uniquely coded lottery tickets. Each such uniquely coded lottery ticket is identified in a manner that reflects the amount of money for which it was exchanged.

The ticket-issuing and money-receiving entity TIAMRE keeps account of all the uniquely coded lottery tickets exchanged by it in return for amounts of money received from the various individual entities; and transmits information with respect to key characteristics of each of these lottery tickets, such as identification code and dollar denomination, to the random choice and disbursing entity RCADE.

The ticket-issuing and money-receiving entity TIAMRE conveys to the utilization means UM the money received in exchange for lottery tickets; which utilization means UM utilizes the money thus obtained to generate profits.

At least part of the profits generated by the utilization means UM are provided as a flow of disbursement funds to the random choice and disbursing entity RCADE, there to be placed into a disbursement fund.

Periodically and repeatedly, preferably once each week, the random choice and disbursing entity RCADE randomly selects the identification codes of a relatively few of the numerous issued lottery tickets and accredits each chosen identification code with a substantial amount of funds from the disbursement fund. Thereafter, the random choice and disbursement entity RCADE arranges to inform the holders of the issued lottery tickets with respect to the chosen identification codes and the amount of funds accredited thereto.

Upon verification to such effect, each holder of a lottery ticket bearing one of the chosen identification codes is entitled to obtain from the random choice and disbursing entity RCADE the total amount of funds accredited to the identification code of that certificate.

Thus, the process of randomly choosing a few lottery tickets by their identification codes and making a substantial disbursement to each of the holders of the monetary certificates bearing the chosen identification codes is carried out on a substantially continuous basis; which means that each individual lottery ticket represents a continuously repeating opportunity to receive a substantial disbursement of funds.

In the preferred embodiment, the rate of funds disbursed by the random choice and disbursing entity RCADE to the holders of lottery tickets is such as, on the whole, to represent a fair return on the monies exchanged therefor; which is to say that, on a statistical basis, each lottery ticket, regardless of its face value or denomination, earns a monetary return commensurate with this face value as well as with the profits generated by the utilization means UM.

The cost of a lottery ticket might be as low as $1.00. To cost-effectively permit the holders of such low-cost lottery tickets to gain a relatively high rate of average return (or profits or winnings), only one out of one million lottery tickets would be chosen each week; and the chosen one-in-a-million ticket would receive the total profit earned by one million dollars for one week. At an annual return-on-investment-rate of 15%, the weekly profits from a one million dollar investment would be about $3,000; which would then be the pay-out associated with each one-in-a-million low-cost lottery ticket chosen each week.

Of course, with respect to lottery tickets of higher face value, correspondingly higher pay-outs, and/or higher chances for being chosen for pay-outs, would prevail.

Additional Comments (a) To a person of ordinary skill in the arts most nearly relevant hereto, it will be clear that all the functions associated with the various functional blocks of the systems-process block diagram of FIG. 1 may be performed by automatic means, such as by way of pre-programmed computer and dispenser means.

For instance, even the investment process associated with utilization means UM may be performed automatically, such as by automatically following the investment recommendations issued weekly by a recognized investment advisory service, such as Value Line, Inc. of 711 Third Avenue, New York 10017.

Otherwise, an automatic teller machine may accept small dollar amounts from an individual entity or person and issue to him lottery tickets in exchange therefor—each lottery ticket thus provided having a specific denomination and a unique identification code.

Alternatively, some or all of the various functions may be accomplished by persons of ordinary skills by simply following clearly specifiable procedures.

(b) After a very large number of lottery tickets have been issued, to provide for an increased level of perceived value (such as associated with the prospect of winning an extra large prize) one of the periodically chosen identification codes would be accredited with a particularly high pay-out, such as several million dollars. This increased pay-out would be counter-balanced by somewhat reduced pay-outs to the other chosen identification codes.

(c) It is anticipated that the lottery tickets will be of at least two different types. One type would permit the individual owner to be specifically identified; another type would be in the form of bearer certificates.

By their very nature, the bearer certificates would be easily tradeable; and, if subject High-Return Lottery Process and System were to become widely and successfully accepted, the bearer certificates would become as liquid and tradeable as ordinary money. In effect, they would constitute interest-bearing money.

Hence, it would not be unreasonable to expect that a large number of people would simply prefer to convert a good deal of their available money funds into such lottery tickets.

(d) By making the rate of pay-outs to the lottery ticket holders lower than the actual rate of profits on the underlying investments by an amount equivalent to the inflation rate, and by effectively adding the retained profits to the total money available for investment by the utilization means UM, full protection against inflation will have been achieved.

Then, subject lottery tickets will increase in dollar value at the inflation rate.

For instance, with a profit equal to 15% p.a., an inflation rate of 4% p.a., an average rate of pay-outs equal to 11% p.a., and with the 4% p.a. difference between profits and pay-outs being used for maintaining the real value of the lottery tickets (which is to say, the real value of the underlying investments), the nominal dollar value of the lottery tickets would increase exactly at the inflation rate.

(e) In case the holder of a lottery ticket with a chosen identification code chooses not to or otherwise fails to collect the funds accredited to that chosen identification code, the probability of that particular identification code being chosen in the future will be adjusted upward by a factor equal to the factor by which the amount of uncollected funds exceeds the face value of the lottery ticket to which the chosen identification code belongs.

More particularly by way of example, if a given lottery ticket has a face value of $10, and if at one point in time that certificate were chosen to be accredited with an amount of $30,000, then—for as long as the accredited amount remains uncollected—this particular lottery ticket would partake in future random choosings with a probability of being chosen that is 3001 times higher than it was before.

(f) Since the lottery tickets of subject Investment Lottery Process and System are ever-lasting in nature, the effective transaction costs associated with participating weekly in the lottery may be kept comparatively low, especially for people living far away from where lottery tickets are sold.

For instance, people living in one country could, during a visit to another country where such lottery tickets were sold, buy a collection of lottery tickets and thereafter partake in the lottery on a continuous basis.

(g) With reference to FIG. 1, it is noted that there is no provision for redemption of the lottery tickets; which therefore means that, once bought, the lottery tickets "are forever". However, it is anticipated that the operator of the Investment Lottery System would provide for means whereby lottery tickets could be bought back at prevailing market rates.

(h) It is anticipated that lottery tickets will be issued and sold in batches, with each batch being associated with a given issue date. It is also anticipated that, in certain cases, it would be appropriate to delay the participation of a given lottery ticket in the lottery drawings. The length of delay—which might be on the order of one or more weeks—would effectively constitute an extra cost to the purchaser; which extra cost could be arranged to correspond to the cost associated with the initial issuance of the lottery ticket.

(i) One convenient and safe way for utilization means UM to generate income from the receipts from the sale of lottery tickets is by investing these receipts in government bonds, certificates of deposit, etc.

However, over the long haul, a higher return on investment will expectedly result by investing in shares of corporate capital stock as listed on various stock exchanges, such as New York Stock Exchange.

For instance, investing solely in shares of corporate stock identified as most timely by The Value Line Investment Survey (a weekly publication by Value Line Publishing, Inc., New York, N.Y. 10017), between the years 1964 and 1990, a total return of more than 2500% would have been achieved; which corresponds to more than 13% per annum compounded; which is far superior to that which would have been obtained by investing in government financial papers.

(j) Clearly, special lottery tickets could be sold in large denominations, such as equivalent to thousands or even millions of dollars; which special lottery tickets would then constitute financial instruments suitable for purchase—for investment purposes—by persons or other entities with large sums of money to invest.

When owning a sufficiently large number of lottery tickets, the statistical (i.e., lottery) characteristics will diminish in significance; and an investor with a sufficiently large holding can therefore substantially count on receiving a steady flow of dividend income, just as much as he could have had he invested in ordinary financial instruments or securities.

(k) The term "lottery ticket" is merely a term of convenience. In reality, each lottery ticket is a financial instrument, which can be provided in a wide variety of forms: it may be provided in the form of a monetary certificate or note, a special bank note, a special check, a special gift certificate, a uniquely coded entry in a bank account, a specially encoded plastic card, a specially encoded crystalline or semiconductor structure; etc.

(l) Preferably, most of the investment income derived by utilization means UM will be used for statistical distribution to the holders of lottery tickets. However, depending on the type of investment income, a smaller or larger part of the income could be retained for re-investment purposes, thereby—as a very minimum—to cause the real value of a given lottery ticket to remain constant over the years. However, in some situations it might be advantageous for utilization means UM to re-invest an extra large part of the income it receives; in which case the real value underlying each lottery ticket would steadily increase; which is to say: its nominal value (i.e., dollar value) would increase at a rate higher than the inflation rate.

Basically, the value of a lottery ticket would be determined by a combination of: (i) the average expected dividend per annum; and (ii) the expected rate-of-rise of this dividend.

(m) Some of the investment income generated by utilization means UM may be generated by trading, which is to say: by buying and selling financial securities. It is anticipated that such buying and selling would be done in accordance with ongoing recommendations obtained from a well-established investment advisor service, such as Value Line.

(n) At any given time: (i) utilization means UM will have invested at least a substantial part of its funds in a portfolio of financial securities; which portfolio would expectedly consist of a variety of different stocks and bonds; (ii) utilization means UM will be in possession of a total net value, which total net value would in effect consist of the market value of its portfolio of financial securities combined with whatever dollar-equivalent cash it might have on hand; and (iii) the market value of a particular lottery ticket (once having been bought by one of the individual entities, such as IE1) would be a certain small fraction of the total net value, which fraction would basically reflect that part of the total net value attributable to the amount of money once having been paid to obtain this particular lottery ticket.

Thus, if each of one million lottery tickets were sold for a given amount of dollar-equivalent money and if the net total amount of funds derived from the sale of these one million tickets were used by utilization means UM to establish its total net value, then each such lottery ticket would represent one millionth of this total net value.

(o) From time to time, even in the absence of new money being supplied to it (as from TIAMRE—see FIG. 1), the total net value represented by the totality of the holdings of utilization means UM will fluctuate, basically in accordance with fluctuations in the market value of its portfolio of stocks and bonds. Thus, the value represented by a given lottery ticket will correspondingly fluctuate.

Hence, in a situation where provisions were made to permit a holder to redeem one or more of his lottery tickets, such redemption would be made on basis of this fluctuating value.

(p) Each time a drawing is made, only one or a few lottery tickets will receive a pay-out. Never-the-less, on a statistical or probabilistic basis, each and every lottery ticket receives a dividend; which is to say: each lottery ticket receives a rate of return on a probabilistic basis. Corresponding to this situation, it is reasonable to refer to probabilistic dividends, probabilistic rate of return, etc.

(q) Although dollars would expectedly be the most common monetary currency being exchanged for lottery tickets, it is to be understood than any dollar-equivalent funds may be used. Thus, when the term dollar is used herein, it should be understood to mean dollar or dollar-equivalent currency.

(r) At any given point in time, the dollar value of a lottery ticket will depend on two basic factors: (i) the then prevailing interest rates; and (ii) the total yield derived from the lottery ticket.

This total yield is the sum of: (i) the probabilistic dividend yield; and (ii) the rate of growth of this probabilistic dividend yield.

Thus—at a prevailing interest rate of 10% p.a.—if a lottery ticket were to provide a probabilistic dividend yield of one dollar per annum and the rate of growth in this probabilistic dividend yield is 10% p.a., then the lottery ticket would have a dollar value of $20.00.

(s) With reference section (k) hereinabove as well to U.S. Pat. No. 4,997,188 to Nilssen, a lottery ticket may be provided in the form of a travelers check; in which case it would obviously be necessary to provide for a redemption means.

(t) A lottery ticket is usually provided in the form of a certificate means. In fact, a preferred way of defining a lottery ticket is to define it as a certificate means having the particular characteristics usually associated with a lottery ticket.

(u) With reference to the systems/process diagram of FIG. 1, the Utilization Means invests a large part of the funds received by the Ticket-Issuing and Money-Receiving Entity in various financial instruments (such as stock certificates, municipal bonds, treasury bills, etc.) and consequently receives a flow of investment income (i.e., a yield). On a periodic basis, the cumulated flow of income is pad to the holders of Lottery Tickets (i.e., to individual entities IE1, IE2, IEx, IEn); except that not all ticket holders get paid each time. Rather, only one (or at most a few) of all the ticket holders gets paid the total cumulated income flow for each period.

Thus, on a probabilistic basis, each ticket holder will get (for each ticket held) an effective total yield proportional to the rate-of-return generated by the Utilization Means.

(v) With reference to section (e) at page 6 herein, it is noted that in the event a given lottery ticket where to have been chosen at a given point in time to be accredited with a significant sum of money, and if the holder of that given lottery ticket were to fail to collect this significant sum of money until some later time, then—until such later time—this given lottery ticket will provide, on a probabilistice basis, a total yield (i.e., rate of return) far higher than that of the other participating lottery tickets.

(w) It is believed that the present invention and its several attendant advantages and features will be understood from the preceding description. However, without departing from the spirit of the invention, changes may be made in its form and in the construction and interrelationships of its component parts, the form herein presented merely representing the preferred embodiment.

I claim:

1. An operational structure comprising:
   first means operative, in exchange for receiving a specified amount of dollars, to issue a certificate means to each of a large number of individual entities; each individual entity becoming a holder of at least one certificate means; each certificate means bearing at least unique identification codes;
   second means functionally connected with the first means and operative: (a) to receive at least a large part of the total dollars received by the first means; and (b) to use a substantial part of the dollars so received to purchase financial securities such as stocks and bonds, thereby to generate a profit; and
   third means functionally connected with the first means and the second means; the third means being operative to: (i) receive disbursement funds from the second means; (ii) receive and keep record of the unique identification codes of all the certificate means issued by the first means; (iii) randomly choose one of the recorded unique identification codes; (iv) effectively accredit an amount of funds to the holder of the certificate means bearing the chosen identification code; (v) inform the various individual entities of the chosen identification code; and (vi) effectively transfer possession of said amount of funds to the holder of the certificate means bearing the chosen identification code;
   the operational structure being arranged to function such as to cause each certificate means to yield an ever-increasing probabilistic dividend.

2. The operational structure of claim 1 wherein the second means attains at least a part of the profit by way of trading financial securities.

3. The operational structure of claim 1 wherein the choosing of one of the recorded unique identification codes is repeated periodically.

4. An operational structure comprising:
   first means operative, in exchange for receiving a specified amount of dollars, to issue a certificate to each of a large number of individual entities; each individual entity becoming a holder of at least one certificate; each certificate bearing a unique identification code;
   second means functionally connected with the first means and operative: (a) to receive at least a large part of the total dollars received by the first means; and (b) to use a substantial part of the dollars so received for investment in financial securities such as stocks and bonds, thereby to generate a net total rate-of-return on its investment; the rate-of-return varying from time-to-time; and
   third means functionally connected with the first means and the second means; the third means being operative to: (i) receive disbursement funds from the second means; (ii) receive and keep record of the unique identification codes of all the certificates issued by the first means; (iii) randomly choose one of the recorded unique identification codes; (iv) effectively accredit an amount of funds to the holder of the certificate bearing the chosen identification code; (v) inform the various individual entities of the chosen identification code; and (vi) effectively transfer possession of said amount of funds to the holder of the certificate bearing the chosen identification code;
   the operational structure being arranged to function such as to cause each certificate to provide, on a probabilistic basis, a total yield proportional to the rate-of-return generated by the second means.

5. The operational structure of claim 4 wherein: (i) the funds accredited to the holder of the certificate having the chosen identification code is made available to this holder in the form of an amount of dollars, which amount of dollars will be available for transfer to the holder within a short period after so demanded by the holder; and (ii) until the holder actually does demand to take delivery of it, at least a substantial fraction of said amount of dollars is used by the second means for investment in additional financial securities.

6. The operational structure of claim 4 wherein, until said amount of funds is converted to dollars and actually transferred to the holder of the certificate having the chosen identification code, this certificate will provide, on a probabilistic basis, a total yield far higher than that of other certificates.

7. An arrangement comprising:
   first means operative, in exchange for receiving a certain amount of dollar-equivalent funds, to issue a certificate to each of a large number of individual entities; each individual entity becoming a holder of at least one certificate; each certificate bearing a unique identification code;
   second means functionally connected with the first means and operative: (a) to receive at least a large part of the total dollar-equivalent funds received by the first means, (b) to use a substantial part of the dollar-equivalent funds so received to purchase financial securities such as stocks and/or bonds, thereby to acquire a portfolio of financial securities, (c) from time-to-time receive dividends and/or interest from these financial securities, thereby attaining dollar-equivalent funds, (d) from time-to-time to sell some of these financial securities, thereby attaining dollar-equivalent funds, and (e) from time-to-time to use these dollar-equivalent finds for purchasing other financial securities; whereby the second means at any given time is in possession of a total net dollar-equivalent value represented by the sum of: (i) the dollar-equivalent market value of its portfolio of financial securities at that given time, and (ii) any amount of dollar-equivalent funds it may have in its possession at that given time; and
   third means functionally connected with the first means and the second means; the third means being operative: (i) to receive dollar-equivalent disbursement funds from the second means; (ii) to receive and keep account of the unique identification codes of all the certificates issued by the first means; (iii) to keep account of the total number of issued but not-yet-redeemed certificates; and (iv) upon demand by a holder of a certificate, to disburse in exchange for this certificate an amount of dollar-equivalent funds corresponding to a certain fraction of the total net dollar-equivalent value possessed at that time by the second means; this certain fraction being substantially equal to one divided by the total number of issued but not-yet-redeemed certificates;
   whereby a holder of a certificate may at times redeem such certificate for a dollar-equivalent amount of funds; which amount will fluctuate from time-to-time.

8. The arrangement of claim 7 wherein the third means is also operative, from time-to-time, to randomly choose one of the unique identification codes and to accredit to the holder of the certificate bearing that unique identification code an amount of dollar-equivalent funds.

* * * * *